(12) United States Patent
Challener et al.

(10) Patent No.: US 8,266,449 B2
(45) Date of Patent: Sep. 11, 2012

(54) SECURITY FOR STORAGE DEVICES

(75) Inventors: David C. Challener, Raleigh, NC (US);
Steven D. Goodman, Raleigh, NC (US);
Randall S. Springfield, Chapel Hill, NC (US); Jeffrey R. Hobbet, Holly Springs, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 598 days.

(21) Appl. No.: 12/415,495

(22) Filed: Mar. 31, 2009

(65) Prior Publication Data

US 2010/0250959 A1 Sep. 30, 2010

(51) Int. Cl.
*G06F 21/00* (2006.01)
(52) U.S. Cl. ............... 713/189; 711/114; 711/E12.103; 726/26; 713/193
(58) Field of Classification Search .................. 713/189, 713/193; 726/27; 711/114
See application file for complete search history.

(56) References Cited

U.S. PATENT DOCUMENTS

| | | | |
|---|---|---|---|
| 6,026,354 A * | 2/2000 | Singh et al. | 702/186 |
| 6,668,323 B1 * | 12/2003 | Challener et al. | 713/183 |
| 6,683,954 B1 * | 1/2004 | Searle | 380/30 |
| 2005/0268339 A1 * | 12/2005 | Bobrow | 726/26 |
| 2008/0045234 A1 * | 2/2008 | Reed | 455/456.1 |
| 2008/0077800 A1 * | 3/2008 | Wang et al. | 713/187 |
| 2009/0048976 A1 * | 2/2009 | Hars | 705/50 |
| 2009/0271638 A1 * | 10/2009 | Kawakami et al. | 713/193 |
| 2010/0211802 A1 * | 8/2010 | Humphries et al. | 713/193 |

OTHER PUBLICATIONS

Diffie, et al, in "Multiuser Cryptographic Techniques," AFIPS—Conference Proceedings, vol. 45, pp. 109-112, Jun. 8, 1976.*
Impact of FDE on Digital Forensics—2008 (Casey et al.).*

* cited by examiner

*Primary Examiner* — Jung Kim
*Assistant Examiner* — Tri Tran
(74) *Attorney, Agent, or Firm* — Ference & Associates LLC (57) ABSTRACT

The invention broadly contemplates a security solution for storage devices that is inexpensive and robust. The invention allows a store of system specific data to be used to release the hard disk key of full-disk encryption (FDE) drives. This system specific data is passed to the FDE drives and used to calculate the actual encryption key. This allows for safe disposal of an FDE drive containing confidential data, as the lack of available system specific decryption data makes decryption virtually impossible.

14 Claims, 4 Drawing Sheets

SECURITY FOR STORAGE DEVICES

FIELD OF THE INVENTION

This invention relates generally to securing storage devices. More specifically, this invention is directed systems, methods and processes for securing of RAIDed (Redundant Array of Independent Disks) drives.

BACKGROUND OF THE INVENTION

RAID is a technology that employs the simultaneous use of two or more hard disk drives to achieve greater levels of performance, reliability, and/or larger data volume sizes. RAID is now used as an umbrella term for computer data storage schemes that can divide and replicate data among hard disk drives. Various designs involve the design goals of increased data reliability and increased input/output performance. When several physical disks are set up to use RAID, they are said to be in a RAID array. The RAID array distributes data across several disks, but the user and operating system see the array as one single disk. RAID can be configured in various ways to serve different purposes.

RAID arrays include a RAID controller (card) that interconnects the drives in the array. Problems are often encountered regarding security for storage disks, including disks in RAID arrays, such as when disks are to be disposed of. Some useful background information is available in *IBM Fortifies SMB Data*, July 2008; available at: ftp://ftp.software.ibm-.com/common/ssi/sa/wh/n/xsw03019usen/XSW03019USEN.PDFT, incorporated by reference here. The disks may contain data (e.g. confidential data) that should not be disposed of in a way in which access to the data by unauthorized persons is permitted. Simply stated, the task is to create, on a server that is using RAID, encrypted storage so that in the case of disposal of the drive, the data is not readable.

Existing solutions include a RAID controller with a built-in crypto engine to encrypt data that is written to and de-crypt data that is read from the RAIDed drives. For example, IBM Corporation's solution (VAULT—ServeRAID-MR10is) is a RAID SAS/SATA storage controller card that includes high-performance hardware based encryption. This solution includes expected qualities in that it provides a RAID card that enables multiple disks to be configured to provide highly available storage and it supports all major RAID levels. Notably, the solution provides an integrated encryption technology wherein the encryption/decryption is performed on the RAID controller. Significant drawbacks with such an encrypted controller are cost and introduction of a single point of failure.

As above, this conventional solution may at first seem appealing. However, this conventional solution has at least two significant issues. The first one is monetary and that is if the system is going to be encrypting all the data going to multiple drives, the encrypting (RAID) controller needs to be very fast. Phrased differently, typically in a RAID configuration, the speed of access to the data is controlled by the read-write speed of the drive. Thus, the RAID controller becomes a speed bottleneck unless considerable power is built into the chip of the encrypting RAID controller. Accordingly, this conventional solution has proven to be quite expensive (e.g., on the order of $2000).

The second problem with this conventional solution is that a reason RAIDed systems are implemented in the first place is that one wants to avoid a single point of failure (i.e., introduction of redundancy is desirable). However, employing the conventional solution introduces that single point of failure, i.e., the encrypting RAID controller. Accordingly, if the encrypting RAID controller fails, the encryption key is lost and the data on the disks becomes inaccessible even to authorized users. This is a situation to be avoided.

Existing solutions are costly since RAID controllers are often designed to be in communication with significant number of drives, such as 10 or more, and logistical considerations for encrypting/decrypting every single one of the drives can become enormous. Particularly, since RAID controllers are intended to quickly and flexibly manage access to multiple drives, the encryption hardware at the RAID controller needs to operate very quickly. In order to afford such speed and flexibility, especially in step with more and more drives assumed under control in the RAID array, tremendous costs are required to maintain the speed and nimbleness needed to preserve efficiency and avoid system slowness.

Accordingly, the inventors have recognized a need for an inexpensive and robust security arrangement for RAIDed systems.

SUMMARY OF THE INVENTION

Generally, there is broadly contemplated herein, in accordance with at least one presently preferred embodiment of the present invention, arrangements and methods for employing a RAID controller, and full disk encryption (FDE) disks in a RAID array, in a manner to ensure that the disks are always adequately encrypted but to do so without needlessly expensive system resources. Particularly, there is broadly contemplated herein the employment of a public-private key pair arrangement involving the RAID controller and the disks that allows disks to be separated but still encrypted on a local level.

At least one embodiment of the instant invention broadly contemplates a security solution for RAIDed disks that is inexpensive and robust, providing two broad solutions for securing RAIDed disks. The first allows the system to store data that is used to release the hard disk key for a fall-disk encryption (FDE) drive. This data is passed to the encrypting hard disk at boot and the hard disk uses this data to permit access to the encrypted data.

The second uses a drive that has two or more sections, with at least one encrypted section and at least one unencrypted section. The unencrypted section is booted and reads data from the system, for example, from BIOS, asset tag information, random numbers stored in the boot block, the motherboard serial number, etc. The system specific data is used to create a password that is used by the drive to permit access to the encrypted section (release the hard disk key). Optionally, this password can also be stored in an encrypted form on the unencrypted section, i.e., encrypted itself with a public key in a public/private key encryption scheme. Thus, in the case of the motherboard dying or moving the hard drive to a new system, the encrypted data on the drive can still be recovered.

In summary, one aspect of the present invention provides an apparatus comprising: at least one processor; and at least one tangible storage device configured in a RAID array; wherein the at least one tangible storage device comprises at least one unencrypted region and at least one encrypted region; and wherein the at least one unencrypted region tangibly embodies a program of instructions that when executed by the at least one processor enable the apparatus to: obtain apparatus specific data; encrypt the apparatus specific data; and encrypt a disk encryption key stored within the at least one tangible storage device with the encrypted apparatus specific data.

Another aspect of the present invention provides a method comprising: obtaining apparatus specific data; encrypting the apparatus specific data; communicating the apparatus specific data to at least one tangible storage device configured in a RAID array; and encrypting a disk encryption key stored within the at least one tangible storage device with the encrypted apparatus specific data.

A further aspect of the present invention provides a program storage device readable by machine, tangibly embodying a program of instructions that when executed by at least one processor of the machine enable the machine to: obtain apparatus specific data; encrypt the apparatus specific data; communicate the apparatus specific data to at least one tangible storage device configured in a RAID array; and encrypt a disk encryption key stored within the at least one tangible storage device with the encrypted apparatus specific data.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

It will be readily understood that the components of the present invention, as generally described and illustrated in the figures herein, may be arranged and designed in a wide variety of different configurations in addition to the described presently preferred embodiments. Thus, the following more detailed description of the embodiments of the present invention, as represented in the figures, is not intended to limit the scope of the invention, as claimed, but is merely representative of selected presently preferred embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, in which like reference numerals have been used for like items as appropriate.

The following description is intended only by way of example, and simply illustrates certain selected presently preferred embodiments of devices, systems, processes, etc. that are consistent with the invention as claimed herein.

Initially, it should be understood that the invention, according to at least one embodiment, takes advantage of full-disk encryption (FDE) drives, which are currently readily available (e.g. from Seagate™, e.g. Cheetah® drives). General background on FDE drives which may be useful may be found at http://www-307.ibm.com/pc/support/site.wss/ document.do?sitestyle=lenovo&lndocid=MIGR-69621.

Some useful background information on a Cheetah® drive is available at: http://www.seagate.com/docs/pdf/marketing/ po_cheetah_15_k6.pdf, incorporated by reference here. However, as will be readily apparent to those having ordinary skill in the art, any of a variety of FDE drives could be utilized in connection with this invention.

These FDE drives are operable in, among other things, two different states. In one state, a section of the drive that is completely unencrypted is utilized. And in the other state, another section of the drive that is completely encrypted is utilized. The encryption is done by the drive itself using an encryption chip internal to the drive. So outside the drive, it appears as (as long as a password is entered into the drive, which the drive uses to decrypt the real encryption key) an unencrypted drive.

Notably, the FDE drives can boot in a state first to the unencrypted portion of the drive. The encrypted portion of the drive is not visible at this point. Then, a password can be entered into the drive and it will swap where the logical block address parts are now directed, i.e., to the encrypted portion of the drive. At this point, the encrypted portion now looks unencrypted. So in a sense, the FDE drive appears to have unplugged one drive (unencrypted) and plugged in another one (encrypted) without losing power.

It should be understood that these FDE drives are encrypting 100% of the time whenever data is written to the encrypted portion, even if it looks like the unencrypted portion, as above. Once a password is set, the user cannot access the encrypted drive until the password has been entered. Once the password is entered, the encrypted portion looks unencrypted, though encryption is taking place. This is comparable to the way normal ATA specification drives work today that have passwords. As can be appreciated, once a password is set, the FDE drives are secured and can just be thrown away if they need to be disposed of.

FDE drives, however, have not heretofore been utilized in a RAID configuration because of issues associated with managing the passwords for each of the different drives in the RAID configuration. For example, a company may have a server that has RAIDed sets of drives in it and eventually one of those drives is going to fail. As above, RAID stands for Redundant Array of Independent Disks, sometimes also referred to as Redundant Array of Inexpensive Disks, and the inexpensive indeed indicates that the reliability is not as good. One reason companies employ RAID arrays is to provide reliability using parallelism. So, as drives fail, they can be pulled out and a new drive can be plugged in. A password protected FDE drive, however, cannot just be plugged in without somehow handling the password used for the encryption key. Accordingly, a system specific password scheme is utilized by an embodiment of the instant invention to allow FDE drives to be easily utilized in a RAID array.

Referring now to the figures, at least one presently preferred embodiment will be described with reference to the accompanying drawings.

Figure 1:
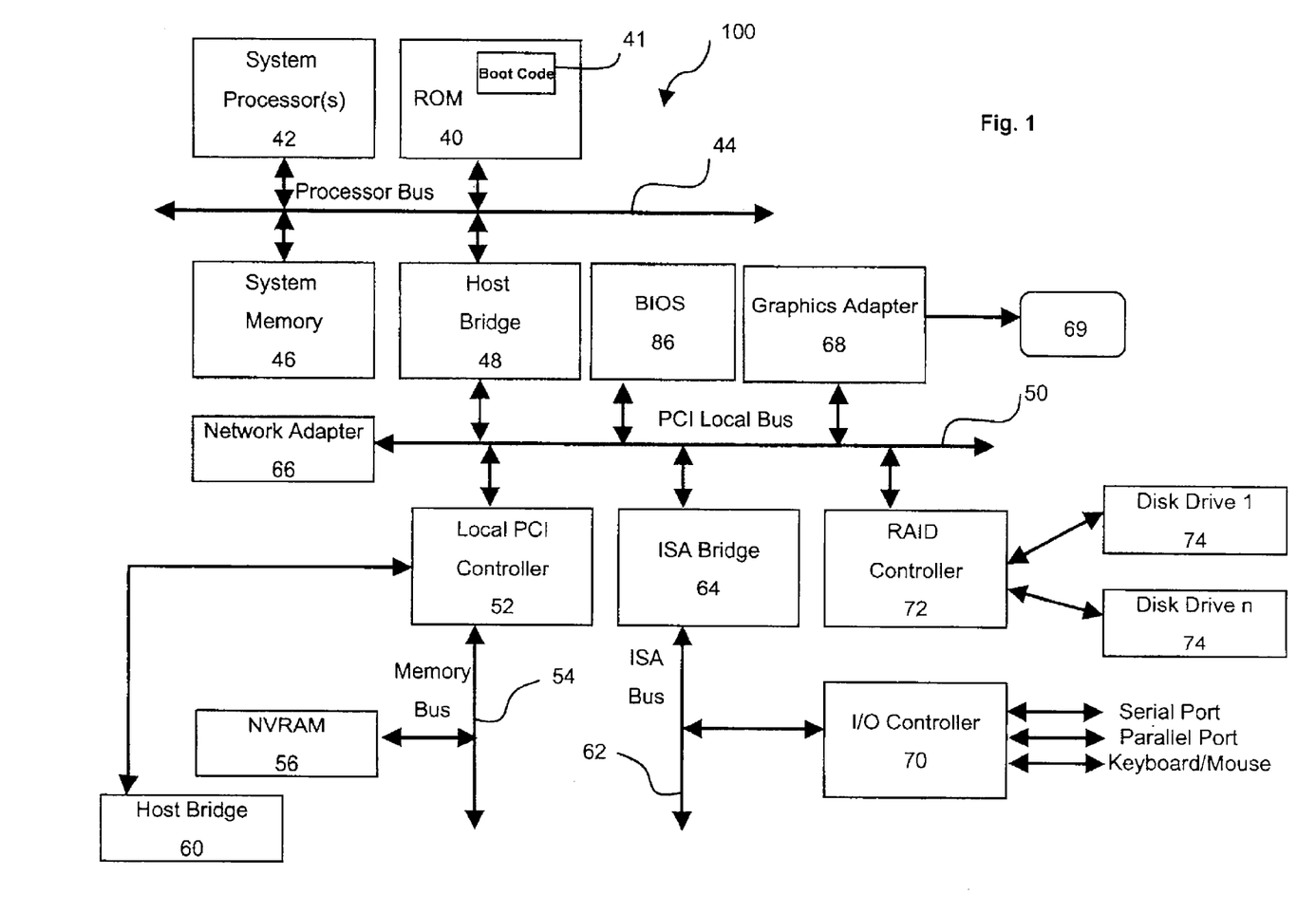
FIG. 1 schematically illustrates a computer system with added components.

FIG. 1 depicts a block diagram of an illustrative embodiment of a computer system 100. The illustrative embodiment depicted in FIG. 1 may be a server computer system, such as one of the ThinkServer™ series of server computers sold by Lenovo (US) Inc. of Morrisville, N.C., however, as will become apparent from the following description, the present invention is applicable to any data processing system.

As shown in FIG. 1, computer system 100 includes at least one system processor 42, which is coupled to a Read-Only Memory (ROM) 40 and a system memory 46 by a processor bus 44. System processor 42, which may comprise one of the AMD™ line of processors produced by AMD Corporation or a processor produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to a LAN, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard and mouse. In addition, I/O controller 70 supports external communication by computer system 12 via serial and parallel ports. A RAID controller 72 is in communication with n RAIDED disk drives 74 (1 ... n). Generally, in known manner, the RAID controller 72 will act to manage the n disk drives 74 (1 ... n) as to freely and flexibly manage and transfer data among the disk drives in such a way that the disk drives 74 (1 ... n) collectively behave as a single disk drive.

Indicated at 86 is a BIOS (basic input/output system) whose functioning, in accordance with at least one presently preferred embodiment of the present invention, will be better understood from further discussion below.

Of course, it should be appreciated that the system 100 may be built with different chip sets and a different bus structure, as well as with any other suitable substitute components, while providing comparable or analogous functions to those discussed above.

It should be readily understood that FIG. 1 illustrates a computer system 100 that itself can be considered an illustrative example of a "server" system as broadly defined herein in the context of a server-client relationship. Of course, other types of server systems can easily be employed within the context of one or more embodiments of the present invention.

The disclosure will now turn to a discussion of a single FDE drive in accordance with the present invention. In this regard, it should be recognized that a RAIDed drive is an amalgamation of some number of single drives and a discussion of a single drive is appropriate. Further below, the disclosure will discuss a RAIDed drive in accordance with the present invention.

Figure 2:
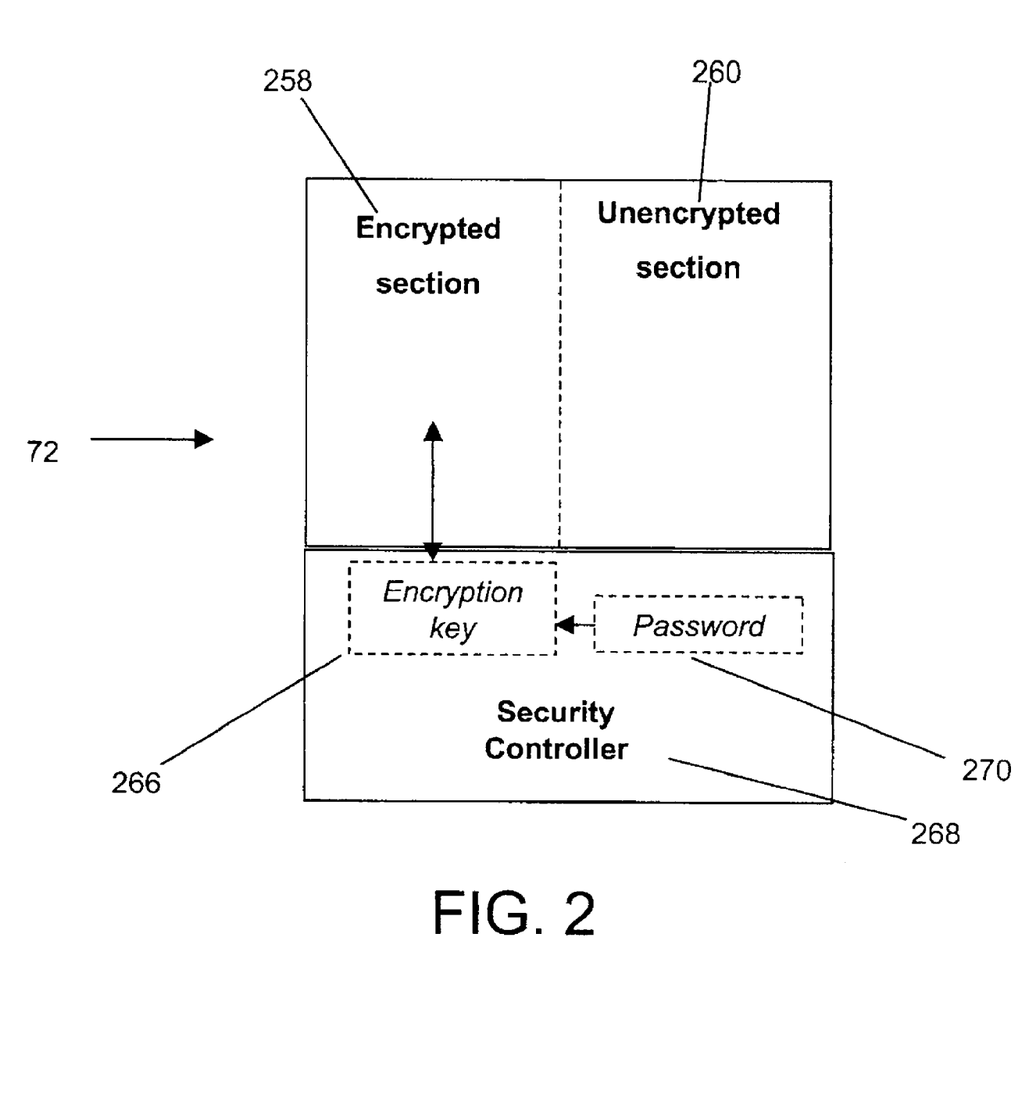
FIG. 2 schematically illustrates an FDE drive.

Schematically illustrated in FIG. 2 is a drive 72. Preferably, drive 72 is an FDE drive such as the Cheetah drive discussed above and which includes a security controller (268) and is split into encrypted (258) and unencrypted (260) sections. The security controller contains an encryption engine (not shown) which typically comprises a secure microprocessor and memory. The security controller utilizes an encryption key (266) set when writing or reading data from the encrypted section of the drive. Typically, the encryption key is stored in non-volatile random access memory (NVRAM) (not shown).

A user does not know what encryption key is being used and the encryption key may not be retrieved. Typically, the encryption key is generated and maintained by the FDE drive itself in a manner chosen by the drive manufacturer. Similarly, the manner of encryption and key length used in the FDE drive is selected by the manufacturer depending, in part, on the level of security desired. An example of encryption that may be used is AES, and an example key length is 128-bit. The encryption key is generally not system specific. Thus, since the key is maintained by the drive, when the drive is removed from the machine in which it is installed, the encrypted data may still be read by, for example, installing the drive into another machine or system. It is possible, however, to change the encryption key (e.g., have the FDE drive regenerate the key). Doing so, however, will make all previously written data inaccessible, effectively wiping the drive.

One manner in which access to data on an FDE drive by unauthorized users is prevented, for example, when the drive is installed into another machine, is through the use of a password (270). The FDE drive password prevents unauthorized users from and accessing data on the drive (regardless of in what machine the drive is installed), while full disk encryption prevents more sophisticated attacks, such as attempting to retrieve data directly from the drive's platters. More than one password may be used, i.e., master and user passwords, with different levels of access associated with each password. A password, however, must be set. In the absence of a password, any user or system will be able to access the data on the encrypted portion of the drive as described above.

Figure 3:
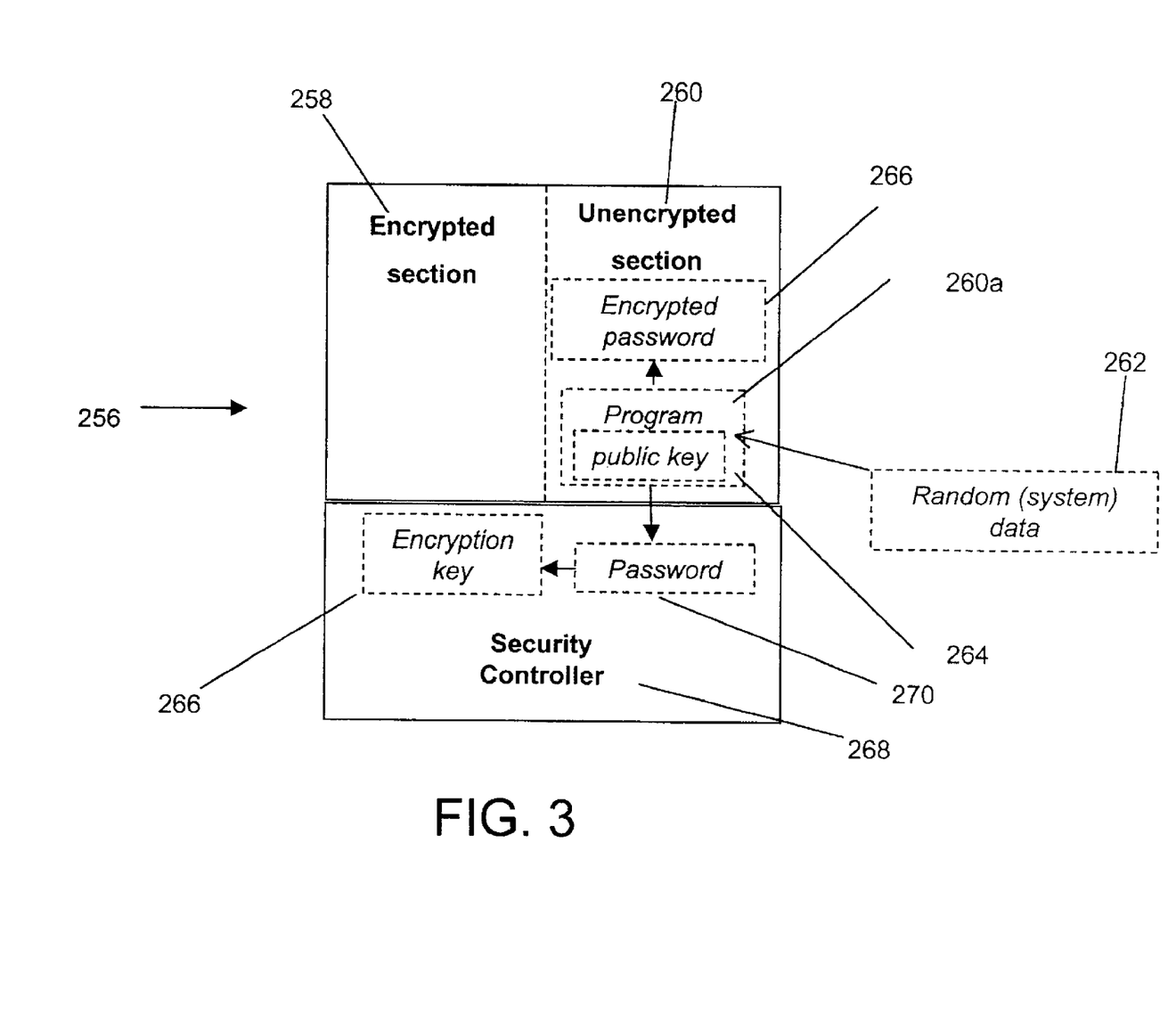
FIG. 3 schematically illustrates an FDE drive in accordance with an embodiment of the present invention.

In accordance with at least one presently preferred embodiment of the present invention, a partitioned FDE drive with a security controller may be employed as shown in FIG. 3 in a manner to alleviate, at least partially, the burden of disk encryption from a RAID controller. Preferably, the unencrypted portion 260 may be sufficiently small as to contain a small amount of code (or a small program) 260a.

Preferably, the code/program 260a will be configured for obtaining from part of the system some random data 262 that can be transformed into a system specific password. For instance, this may be found on the motherboard in a variety of locations. Particularly, a BIOS 86 (see FIG. 1) will typically include a section of random data. Network drives, MAC keys and other components, as known to those of ordinary skill in the art, also typically include random data that can easily be obtained by a simple code/program and may be used in the present invention although it is presently preferred that random data located on a system motherboard be used. The data is referred to herein as random data in that it is specific (i.e., unique) to a particular system and is not guessable by an attacker. The exact random data that is obtained is not material, so long as the identical random data is available each time the machine is turned on. Preferably, then, the code/program 260a will obtain the random data 262 and utilize the same to generate a password for the FDE drive.

The manner in which the password is generated is not material. For example, a certain number of bits of the random data may be used as the password or the random data may be hashed using any number of known cryptographic hash functions (such as SHA 256) to obtain a standardized length string to be used as a password. Preferably, the code/program 260a will also assimilate a public encryption key 264. Preferably public encryption key 264 is contained within program 260a, although the public encryption key may also be located elsewhere and be obtained by program 260a, for example, the public encryption key may be provided by an organization from a server. This public encryption key 264 is the public portion of a public/private key encryption scheme, which will be discussed further below. Well known examples of public/private encryption schemes include Diffie-Hellman and RSA. The RSA scheme is described in U.S. Pat. No. 4,405,829. Any acceptable public/private encryption scheme, however, is suitable for the present invention.

Figure 4:
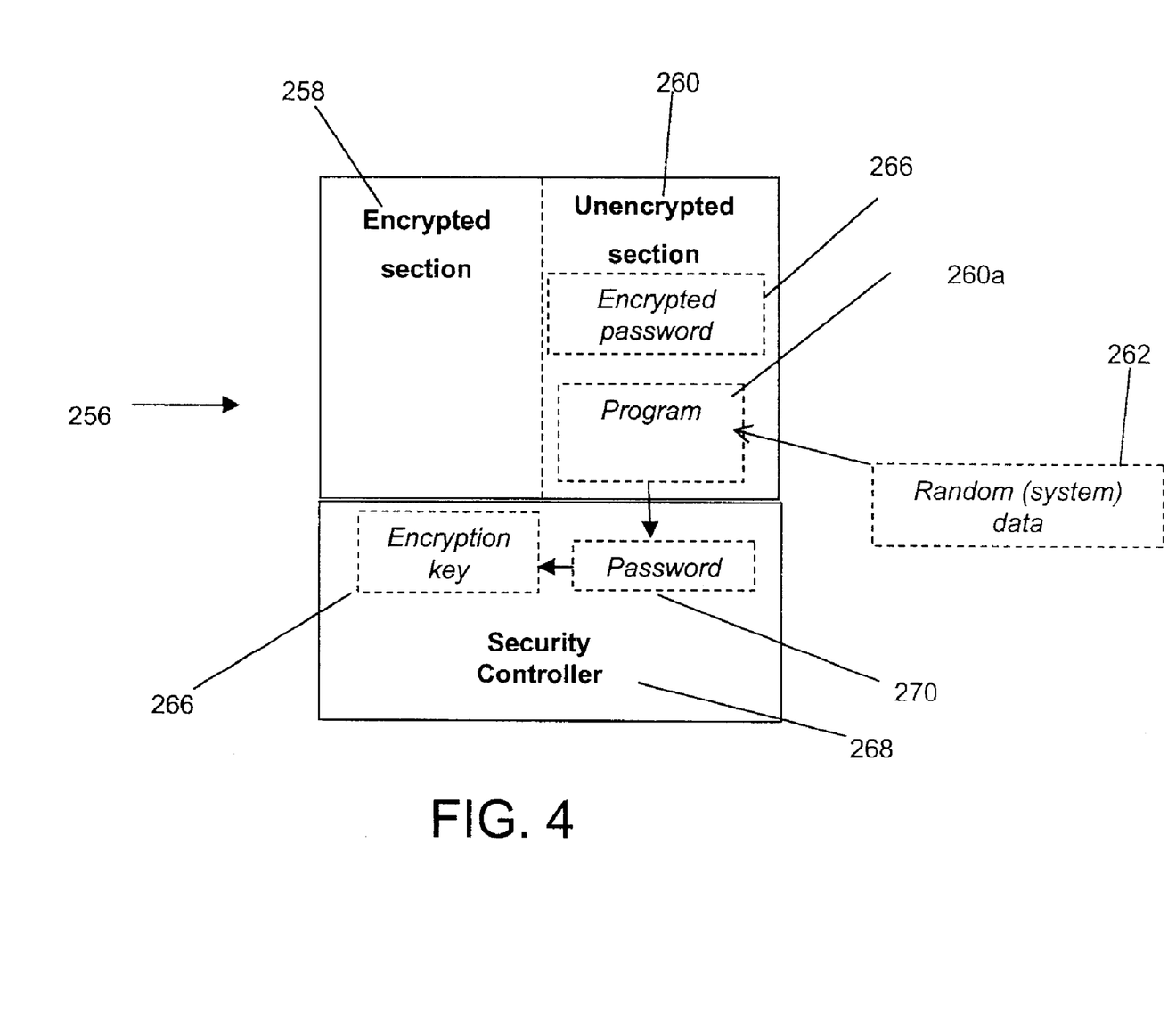
FIG. 4 schematically illustrates an FDE drive in accordance with an embodiment of the present invention.

The disclosure will now turn to a discussion of setting the FDE drive for operation in accordance with the present invention. When a password is not set on an FDE drive, the drive preferably boots to the unencrypted portion of the drive and program 260a preferably obtains random system data 262 that is then used to generate a system specific password, as described above. Password 270 of the FDE drive is then set to this generated password. In addition to setting the password of the FDE drive, program 260a uses public key 264 to encrypt a copy of password 270. This encrypted copy of the password is then stored on the unencrypted section 260 of the FDE drive, for example as shown in FIG. 2 as encrypted password 266, for reasons discussed herein. Once the password on the FDE drive has been set, on subsequent boots of the drive, the drive will preferably boot to the unencrypted section 260. Referring now to FIG. 4, program 260a obtains random system data 262 which is used to generate (in the manner discussed above) a password phrase which is then passed to the security controller of the FDE drive for authentication against previously set password 270. If the generated password phrase does not authenticate (or match) password 270 access to the encrypted section 250 of the FDE drive is prohibited. If, however, the password phrase is authenticated, control of the FDE drive is then passed to the encrypted portion of the drive. The hard drive knows the encryption key. So, the FDE drive changes the logical block addressing (LBA) pointer (LBA0) so it points to the encrypted portion of the drive. And now, the unencrypted portion of the drive is invisible and the encrypted portion of the drive is visible. Background information on logical block addressing may be found at http://en.wikipedia.org/wiki/Logical_block_addressing. An example of a program which performs some function (but not all) of program 260a of the present invention is EMBASSY® Trusted Drive Manager available from Wave Systems Corp., Lee, Mass., www.wave.com.

By storing encrypted password 266 (a copy of password 270 encrypted with public key 264) on unencrypted section 260 of the FDE drive, password 270 may be recovered in appropriate situations using the private key of the public/private key encryption algorithm. Such a situation may be where the FDE drive is moved to another machine (or system) and the password phrase generated by program 260a is not authenticated by the FDE drive against password 270. Depending on the level of security desired, the private key may be made available to select members of the public (e.g., authorized service technicians) or the private key may not be distributed but rather the controlling organization may require that a copy of encrypted password 266 be provided to it and the organization would then return password 270. In this situation, encrypted password 266 may be provided by any number of means, including, but not limited to mailing a copy on a disk to providing same over a network connection to a secure server to which only appropriately credentialed personnel would have access.

The disclosure will now turn to a discussion of using an FDE drive configured as discussed above in a RAID configuration. A RAID configuration is an amalgamation of any number of drives. In the context of the present invention, while the data on the individual drives may be laid down in accordance with the RAID standard used, each individual drive has a unique encryption key and is not known to a user of the drive. In accordance with the present invention, while the encryption key of each drive is unique, the password used for each drive is identical and is tied into the physical machine into which the RAID configuration is installed. Thus, program 260 initially acts to set the password for each drive in the RAID configuration and thereafter passes the password generated utilizing the random system data 262 to each of the FDE drives in the RAID configuration.

Thus, the very first time n-RAIDed drives are installed (e.g. RAID 10), the first thing is to go to the unencrypted portion of each drive and load the program application. The program reads (e.g., from the motherboard) the random data, creates the (motherboard or system) specific password, and encrypts it with a public key. The password for all of the RAIDed drives is set to the system specific password and a copy of encrypted system specific password is stored on the unencrypted portion of the drive. Thus, all the RAIDed drives have the same password that is utilized to pass control of all of the drives to the encrypted portion of the drives. Accordingly, the system now has n-RAIDed drives that point to the encrypted portion of the drives. Again, they all look like they are unencrypted to the RAID controller. That is, the RAID controller is passive in this scenario and does not have to be specially modified, as with conventional solutions.

Thus, the RAID controller operates in a conventional fashion, with the FDE disks handling the encryption of data after the initial set up, as above. In the event of a drive failure, there are two easy ways in which the failed drive can now be replaced in the inventive system. One is with a hot swap and one is with a cold swap.

In a RAID configuration there are at least three possible failure scenarios. The three most common failure scenarios—hard drive dies—hot swap, hard drive dies—cold swap, and motherboard failure—will now be discussed in accordance with the present invention.

In the situation where one of the hard drives in the RAID configuration fails and it is replaced without powering down and rebooting the system (a hot swap), a new FDE drive is put in for the failed drive. The new FDE drive is encrypting, but does not have a password set yet. As such, the drive boots (the LBA0 is pointing) to the encrypted portion of the drive. The RAID controller then sees that a new drive has been added and the new drive is not in synch with the other drives in the RAID configuration. The RAID controller then proceeds to synch up the drives. Preferably program 260a then reads the random system data (262), generates the password, sets the password in the security controller for the new FDE drive to the generated password (which is the same as used by the other RAIDed drives), and instructs the drive in the future to boot (e.g, points the drive) to the unencrypted section of the drive. Once the password is set, the drive may be disposed of without worry because the system specific password is required to access and decrypt the encrypted data on the drive.

At some point in time if the system is powered down and restarted (a cold boot), LBA0 points to the unencrypted portion of the drive as it does for all of the drives in the RAID configuration. A new drive can be added via a cold swap at this point. The RAID controller sees that a new drive has been added because it doesn't synch with the unencrypted portion of the other drives in the RAID configuration and writes the unencrypted portion so that it is synched with the unencrypted portions of the other drives in the RAID configuration. Preferably, once RAID configuration has been rebuilt, the program 260a in the unencrypted portion of the drive obtains the random system data (262) to generate a password and re-sets the password (270) on all of the FDE drives. The FDE drives can now unlock and move their LBA0 to the encrypted section (258) of the drive (but now looks unencrypted to the RAID controller and indeed the remainder of the system).

Another embodiment of the present invention is applicable to the situation where the motherboard of the system in which the RAID configuration is installed dies. In such a circumstance, the system is typically powered down, the motherboard replaced, and the system restarted. In accordance with the present invention, when the FDE drives boot and random system data (262) is obtained to generate a password to be authenticated against FDE drive password 270, the generated password will not be authenticated because the random system data 262 is different because the motherboard has been replaced. As such, the FDE drives will not permit the system to access the encrypted section 250. Preferably, software 260a then prompts for a password to be authenticated against FDE drive password 270. This permits an opportunity for a person to manually enter a password for authentication. Once the correct password has been entered, software 260a preferably generates a new password using random system data 262 obtained from the new motherboard and FDE password 270 is re-set to the newly generated password. It should be understood that typically, when rebooting the RAIDed system (e.g., servers), it can be done remotely utilizing the instant invention. There will be no requirement for entering a password, etc., as this process will be automated by the application program. However, in the case a motherboard failing, when a technician would be required in order to replace the physical component anyway, only then is it permissible that the entry of a password be required.

It should be noted, however, in accordance with the present invention it is possible to manually enter the password to be authenticated because the password has been encrypted with a public key and stored on the unencrypted portion of the drive. In order to have the password to be authenticated, encrypted password 266 must be decrypted using the private key for the encryption scheme. As discussed above, there are any manner of ways in which an organization may provide a private key, depending on the level of security desired for the private key. It should also be noted that there may be more than one private key for each encryption scheme, and that the private keys may vary depending on organization, department, or the like. For example, different customers of a computer supplier may have different private keys. Moreover, in a large organization, private keys may be different for each organization, department, or the like (e.g., there may be one private key for a RAID configuration used by the accounting department and different private key for a RAID configuration used by the marketing department).

As can be appreciated, are a wide variety of ways to implement the public/private key encryption. The central point is that the unencrypted portion of the drive(s) are the only thing accessible on the FDE drives without a motherboard specific password, and a copy of the motherboard specific password encrypted with a public key is stored on the unencrypted portion of the drive, available to be decrypted with the private key in the event the motherboard fails and is replaced (or the RAID configuration is moved to a different machine or system). Thus, when a drive fails, it can be safely disposed of.

As can be appreciated, by employing FDE drives having a motherboard specific password encrypted encryption key stored therein, a redundant and secure system is provided. This avoids the need to employ an encrypting RAID controller and its associated costs.

It should be understood that many of the functional characteristics of the inventive system described in this specification may be implemented as modules. Modules may include hardware circuits such as one or more processors with memory, programmable logic, and/or discrete components. The hardware circuits may perform hardwired logic functions, execute computer readable programs stored on tangible storage devices, and/or execute programmed functions. The computer readable programs may in combination with a computer system and the other described elements perform the functions of the invention.

Embodiments of the invention may take the form of a tangible computer-usable or computer-readable medium providing program code for use by or in connection with a computer or any instruction execution system. Examples of a computer-usable or computer-readable medium include tangible computer media such as semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

In the drawings and specification there has been set forth a preferred embodiment of the invention and, although specific terms are used, the description thus given uses terminology in a generic and descriptive sense only and not for purposes of limitation.

If not otherwise stated herein, it is to be assumed that all patents, patent applications, patent publications and other publications (including web-based publications) mentioned and cited herein are hereby fully incorporated by reference herein as if set forth in their entirety.

What is claimed is:

1. An apparatus comprising:
   at least one processor; and
   at least one tangible storage device configured in a RAID array;
   wherein the at least one tangible storage device comprises at least one unencrypted section and at least one encrypted section; and
   wherein the at least one unencrypted section tangibly embodies a program of instructions that when executed by the at least one processor enable the apparatus to:
   obtain apparatus specific data;
   generate a password based on the apparatus specific data;
   encrypt the password for storage on the at least one unencrypted section; and
   decrypt a disk encryption key stored within the at least one tangible storage device and permit access to the at least one encrypted section responsive to receiving the password;
   wherein the at least one tangible storage device comprises a full-disk encryption (FDE) drive;
   the apparatus further comprising:
   at least one RAID controller;
   wherein a plurality of FDE drives are operatively connected to the at least one processor via the RAID controller; and
   wherein the program of instructions further enables the apparatus to communicate the password to the plurality of FDE drives at boot-up.

2. The apparatus according to claim 1, wherein the apparatus specific data comprises random data specific to a motherboard of the apparatus.

3. The apparatus according to claim 1, wherein the program of instructions further enables the apparatus to encrypt the password with a public key.

4. The apparatus according to claim 1, wherein the apparatus is configured to permit a hot swap of at least one new FDE drive;
   wherein the hot swap comprises communicating the password to the at least one new FDE drive without rebooting the apparatus.

5. The apparatus according to claim 1, wherein the apparatus is configured to permit a cold boot of at least one new FDE drive;
   wherein the apparatus is further configured to synchronize the at least one new FDE drive and communicate to the at least one new FDE drive the password data during synchronization.

6. The apparatus according to claim 1, wherein the at least one tangible storage device boots from the unencrypted section.

7. The apparatus according to claim 1, wherein permitting access to the encrypted section comprises changing a logical block address (LBA) pointer of the at least one tangible storage device to point to the encrypted portion.

8. A method comprising:
   obtaining apparatus specific data from a computing device having at least one processor and at least one tangible storage device configured in a RAID array, the at least one tangible storage device comprised of at least one unencrypted section and at least one encrypted section;
   generating a password based on the apparatus specific data;
   encrypting the password for storage on the at least one unencrypted section; and
   responsive to receiving the password, decrypting a disk encryption key stored within the at least one tangible storage device with the password and permitting access to the at least one encrypted section;
   wherein the at least one tangible storage device comprises a full-disk encryption (FDE) drive;
   wherein a plurality of full-disk encryption (FDE) drives are operatively connected to the at least one processor via a RAID controller; and
   wherein the password is communicated to the plurality of FDE drives at boot-up.

9. The method according to claim 8, wherein the apparatus specific data comprises random data specific to a motherboard of the apparatus.

10. The method according to claim 9, wherein encrypting the apparatus specific data further comprises encrypting the password with a public key.

11. The method according to claim 8, further comprising:
    hot swapping at least one new FDE drive;
    wherein hot swapping comprises communicating the password to the at least one new FDE drive without rebooting the apparatus.

12. The method according to claim 8, further comprising:
    cold booting at least one new FDE drive;
    wherein cold booting further comprises synchronizing the at least one new FDE drive and communicating to the at least one new FDE drive the password during synchronization.

13. The method according to claim 8, wherein the at least one tangible storage device boots from the unencrypted section.

14. A program storage device readable by machine, tangibly embodying a program of instructions that when executed by at least one processor of the machine enables the machine to:
    obtain apparatus specific data from a computing device having at least one processor and at least one tangible storage device configured in a RAID array, the at least one tangible storage device comprised of at least one unencrypted section and at least one encrypted section;
    generate a password based on the apparatus specific data;
    encrypt the password for storage on the at least one unencrypted section; and
    responsive to receiving the password, decrypt a disk encryption key stored within the at least one tangible storage device with the password and permit access to the at least one encrypted section;
    wherein the at least one tangible storage device comprises a full-disk encryption (FDE) drive;
    wherein a plurality of full-disk encryption (FDE) drives are operatively connected to the at least one processor via a RAID controller; and
    wherein the password is communicated to the plurality of FDE drives at boot-up.

* * * * *